US012455563B2

(12) United States Patent
Peng et al.

(10) Patent No.: US 12,455,563 B2
(45) Date of Patent: Oct. 28, 2025

(54) DIAL STRUCTURE, REMOTE CONTROLLER EMPLOYING THE SAME, AND CONTROLLING METHOD

(71) Applicant: SZ DJI TECHNOLOGY CO., LTD., Shenzhen (CN)

(72) Inventors: Tao Peng, Shenzhen (CN); Yin Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 410 days.

(21) Appl. No.: 16/856,750

(22) Filed: Apr. 23, 2020

(65) Prior Publication Data

US 2020/0257286 A1 Aug. 13, 2020

Related U.S. Application Data

(63) Continuation of application No. 15/478,341, filed on Apr. 4, 2017, now Pat. No. 10,635,097, which is a
(Continued)

(51) Int. Cl.
*G05D 1/00* (2024.01)
*G05G 9/02* (2006.01)
(Continued)

(52) U.S. Cl.
CPC ............. *G05D 1/0016* (2013.01); *G05G 9/02* (2013.01); *G05G 9/047* (2013.01); *G06F 3/0338* (2013.01);
(Continued)

(58) Field of Classification Search
CPC ...... G05D 1/0016; B64C 39/024; G05G 9/02; G05G 9/047; G05G 1/08; G06F 3/0338;
(Continued)

(56) References Cited

U.S. PATENT DOCUMENTS 7,091,430 B1 8/2006 Haizima et al.
7,117,845 B2 10/2006 Iwaoka et al.
(Continued)

FOREIGN PATENT DOCUMENTS

CN 1160919 A 10/1997
CN 1577408 A 2/2005
(Continued)

OTHER PUBLICATIONS

The World Intellectual Property Organization (WIPO) International Search Report for PCT/CN2014/092548 Mar. 27, 2015 7 Pages.

*Primary Examiner* — Adam M Alharbi
(74) *Attorney, Agent, or Firm* — ANOVA LAW GROUP, PLLC

(57) ABSTRACT

A controlling method for an unmanned aerial vehicle (UAV) that includes an image device. The controlling method includes transmitting, by a remote controller when a dial of a dial structure of the remote controller is rotated, a first control signal for changing imaging device information of an imaging device of the UAV via a signal transmitting device of the remote controller. The imaging device information comprises at least one of an operating mode of the imaging device, a shutter speed of the imaging device, an aperture size of the imaging device, a light sensitivity of the imaging device, or a preview image of the imaging device. The controlling method further includes transmitting a second control signal for confirming imaging device information via the signal transmitting device by the controller when the dial is slid with a displacement.

20 Claims, 13 Drawing Sheets

Related U.S. Application Data continuation of application No. PCT/CN2014/092548, filed on Nov. 28, 2014.

(51) Int. Cl.

| | | |
|---|---|---|
| *G05G 9/047* | (2006.01) | |
| *G06F 3/0338* | (2013.01) | |
| *H04N 7/18* | (2006.01) | |
| *H04N 23/66* | (2023.01) | |
| *H04N 23/667* | (2023.01) | |
| *H04N 23/72* | (2023.01) | |
| *G05G 1/02* | (2006.01) | |
| *G05G 1/08* | (2006.01) | |
| *G05G 5/06* | (2006.01) | |
| *H04N 23/73* | (2023.01) | |
| *H04N 23/75* | (2023.01) | |

(52) U.S. Cl.
CPC ............ *H04N 7/185* (2013.01); *H04N 23/66* (2023.01); *H04N 23/667* (2023.01); *H04N 23/72* (2023.01); *B64U 2201/20* (2023.01); *G05G 1/02* (2013.01); *G05G 1/08* (2013.01); *G05G 5/065* (2013.01); *H04N 23/73* (2023.01); *H04N 23/75* (2023.01)

(58) Field of Classification Search
CPC ........... H04N 5/23203; H04N 5/23245; H04N 5/2352; H04N 7/185; H04N 23/66; H04N 23/72; H04N 23/667; H04N 23/73; H04N 23/75

See application file for complete search history.

(56) References Cited

U.S. PATENT DOCUMENTS

| | | | |
|---|---|---|---|
| 8,764,564 B2 | 7/2014 | Shikata et al. | |
| 2002/0080114 A1* | 6/2002 | Numata | G05G 9/047 345/156 |
| 2006/0250353 A1* | 11/2006 | Yasutake | G06F 3/0383 345/156 |
| 2009/0238554 A1 | 9/2009 | Niwamae | |
| 2014/0099853 A1* | 4/2014 | Condon | A63F 13/235 446/37 |
| 2015/0370250 A1* | 12/2015 | Bachrach | G05D 1/0027 701/2 |

FOREIGN PATENT DOCUMENTS

| | | | | |
|---|---|---|---|---|
| CN | 1581390 | A | 2/2005 | |
| CN | 1619742 | A | 5/2005 | |
| CN | 1648759 | A | 8/2005 | |
| CN | 101326603 | A | 12/2008 | |
| CN | 201429796 | Y | 3/2010 | |
| CN | 101922599 | A | 12/2010 | |
| CN | 102903557 | A | 1/2013 | |
| CN | 202637984 | U | 1/2013 | |
| CN | 203556143 | U | 4/2014 | |
| CN | 203675482 | U | 6/2014 | |
| DE | 202014011084 | U1 * | 10/2017 | ............ B64C 39/02 |
| EP | 2685336 | A1 * | 1/2014 | ........... G05D 1/0016 |
| JP | H0555431 | U | 7/1993 | |
| JP | H0555432 | U | 7/1993 | |
| JP | 2003162941 | A | 6/2003 | |
| JP | 2005149925 | A | 6/2005 | |
| JP | 2009199405 | A | 9/2009 | |
| JP | 2010073481 | A | 4/2010 | |
| JP | 2013065140 | A | 4/2013 | |

* cited by examiner

DIAL STRUCTURE, REMOTE CONTROLLER EMPLOYING THE SAME, AND CONTROLLING METHOD

CROSS-REFERENCE TO RELATED APPLICATION

This is a continuation application of U.S. application Ser. No. 15/478,341 filed on Apr. 4, 2017, which is a continuation application of International Application No. PCT/CN2014/092548, filed on Nov. 28, 2014, the entire contents of which are incorporated herein by reference.

TECHNICAL FIELD

The present disclosure relates to a dial structure, in particular to a dial structure with a plurality of operating modes, a remote controller employing the dial structure and a controlling method.

BACKGROUND

A dial structure is common control structure in a handheld manipulation device, such as a single lens reflex camera, a remote controller for an unmanned aerial vehicle (UAV), or the like. An operator can operate a dial of the dial structure using fingers, to quickly adjust the UAV, or an aperture, a shutter, an ISO (International Standardization Organization) sensitivity, or the like of the camera.

A conventional dial structure typically provides a single operating function, rather than a combination of multiple operating functions. Thus, for devices like the camera and the UAV remote controller, since a scope that a finger can reach is limited, the operator generally needs operate a plurality of dial structures or other controlling structures to implement one operating function. Alternatively, a plurality of operating functions may respectively require different dial structures. Therefore, it is inconvenient to control.

SUMMARY

In view of this, the present disclosure provides a dial structure that is more convenient to control.

In accordance with the present disclosure, there is provided a dial structure comprising a carrying member and a dial movably connected with the carrying member. The dial is configured to slide with respect to the carrying member along a sliding direction and rotate around a rotation shaft. An axial direction of the rotation shaft intersects with the sliding direction. The dial structure further comprises a rotation sensor configured to obtain rotating state information of the dial and a sliding sensor configured to obtain sliding state information of the dial.

The dial of the above-described dial structure may have a plurality of activity modes, such as dial rotating around the rotation shaft, dial sliding along the sliding direction, and the like. Activity state information of the dial can be obtained by a sensor, to facilitate operating the dial by one operating mode or a combination of multiple operating modes. The purpose of implementing a plurality of operating functions can be achieved without the need to set a plurality of dial structures or other controlling structures. Therefore, it is more convenient for the above-described dial structure to perform a plurality of functions.

Also in accordance with the present disclosure, there is provided a remote controller comprising the above-described dial structure, a controller electrically connected with the rotation sensor and the sliding sensor, and a signal transmitting device electrically connected with the controller. The rotation sensor and the sliding sensor are configured to transfer the rotating state information and the sliding state information to the controller, respectively, and the controller is configured to transmit a corresponding control signal via the signal transmitting device.

Also in accordance with the present disclosure, there is provided a dial structure comprising a dial with a plurality of activity modes and a sensor configured to sense activity state information of the dial.

Also in accordance with the present disclosure, there is provided a remote controller comprising the above-described dial structure, a controller electrically connected with the sensor; and a signal transmitting device electrically connected with the controller. The sensor is configured to transfer the activity state information to the controller, and the controller is configured to transmit a corresponding control signal via the signal transmitting device.

Also in accordance with the present disclosure, there is provided an unmanned aerial vehicle (UAV) controlling method using the above-described remote controller. The method comprises transmitting, by the controller when the dial is rotated, a control signal for changing UAV information of a UAV via the signal transmitting device, and transmitting, by the controller when the dial is slid, a control signal for confirming changed UAV information via the signal transmitting device.

Also in accordance with the present disclosure, there is provided a controlling method for controlling a remotely controlled device using the above-described remote controller. The method comprises transmitting, by the controller when at least one activity mode is selected to operate the dial, a control signal for changing controlled device information of the remotely controlled device via the signal transmitting device, and transmitting, by the controller when another activity mode is selected to operate the dial, a control signal for confirming changed controlled device information via the signal transmitting device.

Also in accordance with the present disclosure, there is provided a controlling method for controlling a remotely controlled device using the above-described remote controller. The method comprises transmitting, by the controller when one of activity modes is selected to operate the dial, a corresponding control signal via the signal transmitting device, receiving, by the remotely controlled device, the control signal, and performing, by the remotely controlled device, a corresponding operation.

Figure 1:
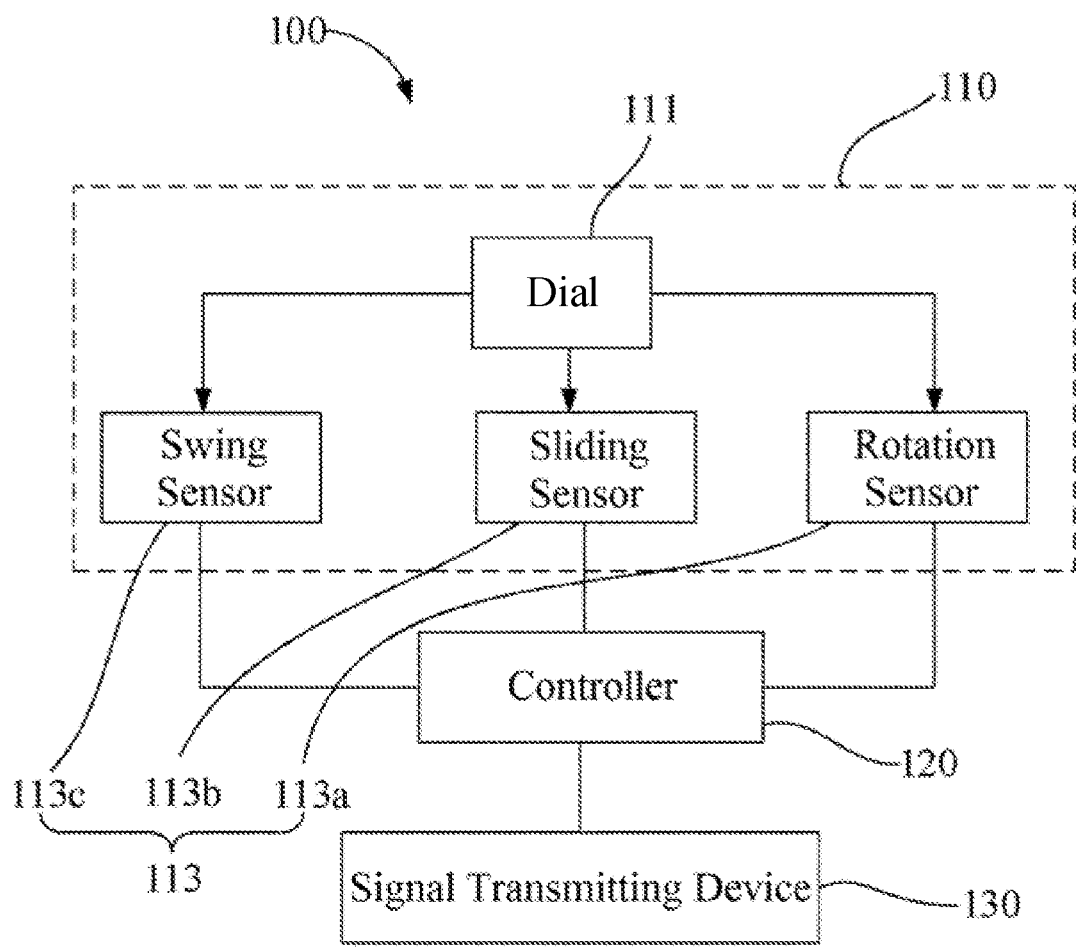
FIG. 1 is a schematic diagram of a remote controller according to an embodiment of the present disclosure.

Exemplary embodiments will be described in detail below in conjunction with the drawings.

DETAILED DESCRIPTION OF THE EMBODIMENTS

The technical solutions of the present disclosure will be described in more detail below in combination with the drawings in the embodiments of the present disclosure. It should be appreciated that embodiments described herein are only some rather than all of the embodiments of the present disclosure. All other embodiments obtained by those having ordinary skills in the art on the basis of the embodiments of the present disclosure without any inventive efforts should fall within the protection scope of the present disclosure.

It is noted that, when a component is referred to as "being fixed to" another component, the component may be directly on the other component or an intermediate component might be present. When one component is considered as "being connected to" another component, the one component may be connected directly to the other component or an intermediate component might be present simultaneously. As used herein, terms 'perpendicular', 'horizontal', 'left', 'right' and similar expressions are only for illustrative purposes.

Unless otherwise defined, all technical and scientific terms as used herein have the same meanings as those generally understood by persons of ordinary skill in the art. Terms used herein in the specification of the present disclosure are only for the purpose of describing specific embodiments, and not intended to limit the present disclosure. The term 'and/or' used herein includes any and all combination(s) of one or more related listed item.

An embodiment of the present disclosure may provide a dial structure comprising a dial with a plurality of activity modes and a sensor configured to obtain activity state information of the dial.

In some embodiments, the activity modes of the dial may include the dial sliding along a preset sliding direction, the dial rotating about a rotation shaft, the dial swinging along a preset swing direction, and so on.

In some embodiments, the sensor may comprise a rotation sensor configured to sense rotating state information of the dial. For example, the rotation sensor may be an angular sensor, an angular displacement sensor, an angular speed sensor, an angular acceleration sensor, a torsion sensor, or the like. In some embodiments, the angular sensor may be configured to sense an angle that the dial rotates, the angular displacement sensor may be configured to sense a rotating angle of the dial with respect to a zero point position, the angular speed sensor may be configured to sense a rotating speed of the dial, the angular acceleration sensor may be configured to sense an angular acceleration when the dial rotates, and the torsion sensor may be configured to sense a magnitude of a torque force endured by the dial when rotating.

In some embodiments, after the dial rotates and is released, the dial may automatically return to an original position. In some embodiments, after the dial rotates and is released, the dial may stop at a current rotating position.

In some embodiments, the sensor may comprise a sliding sensor configured to sense sliding state information when the dial slides. For example, the sliding sensor may be a distance sensor, a linear displacement sensor, a linear speed sensor, a linear acceleration sensor, a pressure sensor, or the like. In some embodiments, the distance sensor may be configured to sense a distance that the dial slides, the linear displacement sensor may be configured to sense a displacement that the dial slides, the linear speed sensor may be configured to sense a sliding speed of the dial, the linear acceleration sensor may be configured to sense an acceleration when the dial slides, and the pressure sensor may be configured to sense a magnitude of a pressure endured by the dial when sliding.

In some embodiments, after the dial slides and is released, the dial may be reset to the original position automatically. In some embodiments, after the dial slides and is released, the dial may stop at a current sliding position.

In some embodiments, the sensor may comprise a swing sensor configured to sense swing state information of the dial. For example, the swing sensor may be an angular sensor, an angular displacement sensor, an angular speed sensor, an angular acceleration sensor, or a torsion sensor. In some embodiments, the angular sensor may be configured to sense an angle that the dial swings, the angular displacement sensor may be configured to sense a swing angle of the dial with respect to a zero point position, the angular speed sensor may be configured to sense a swing speed of the dial, the angular acceleration sensor may be configured to sense an angular acceleration when the dial swings, and the torsion sensor may be configured to sense a magnitude of a torque force endured by the dial when swinging.

In some embodiments, after the dial swings and is released, the dial may be reset to the original position automatically. In some embodiments, after the dial swings and is released, the dial may stop at a current swing position.

Based on the above-described dial structure, an embodiment of the present disclosure may further provide a remote controller employing the above-described dial structure.

The remote controller may comprise the above-described dial structure, a controller electrically connected with the sensor, and a signal transmitting device electrically connected with the controller. In some embodiments, the sensor may transfer the activity state information to the controller, which may transmit a corresponding control signal via the signal transmitting device.

It is noted that, the above-described dial structure may not be limited to being applied on a remote controller, but may further be applied on another electronic device, such as a mobile phone, a tablet, or the like.

Based on the above-described remote controller, an embodiment of the present disclosure may further provide a controlling method for controlling a remotely controlled device. The remote controlling method may control the remotely controlled device by operating the dial of the above-described dial structure.

In some embodiments, the above-described remotely controlled device may be an aerial movable device, a terrestrial movable device, an underwater movable device, an overwater movable device, a gimbal, an imaging device, a sensor, a dock, or the like. The gimbal may be a handheld gimbal, an onboard gimbal, a gimbal loaded on an unmanned aerial vehicle (UAV), or the like. The imaging device may be a camera, a video lens, a video camera, or the like. The aerial movable device may be a UAV, an aerial movable dock, or the like. The terrestrial movable device may be a remotely controlled chariot, a remotely controlled toy, or the like. The underwater movable device may be a toy submarine or the like. The overwater movable device may be a remotely controlled ship or the like. The dock may be a UAV dock or the like.

In some embodiments, the remote controlling method may comprise implementing one operating function by one activity mode of the dial of the above-described dial structure. For example, a moving speed of the remotely controlled device may be adjusted by sliding the dial of the above-described dial structure, and the remotely controlled device may be controlled to stop moving forward by pressing the dial.

In some embodiments, the remote controlling method may comprise implementing one operating function by a combination of a plurality of activity modes of the dial of the above-described dial structure. For example, a numerical value of the moving speed of the remotely controlled device may be selected by sliding the dial of the above-described dial structure to select and the selected numerical value of the moving speed may be confirmed by pressing the dial. The remotely controlled device may be controlled to move at the confirmed moving speed.

Some embodiments of the present disclosure will be described in detail blow in conjunction with the drawings. The following embodiments and features in the following embodiments may be combined when no conflict exists.

Referring to FIG. 1, a remote controller 100 according to an embodiment of the present disclosure may comprise a dial structure 110, a controller 120, and a signal transmitting device 130.

The dial structure 110 may comprise a dial 111 with a plurality of activity modes, and a sensor 113 configured to sense activity state information of the dial 111. In some embodiments, the dial 111 may be movably connected with a carrying member, and the sensor 113 may be configured to sense the activity state information of the dial 111 with respect to the carrying member.

In some embodiments, the activity modes of the dial 111 may be designed according to different requirements, such as the dial 111 rotating around a rotation shaft, the dial 111 sliding along a preset sliding direction, the dial 111 swinging along a preset swing direction, or the like.

Figure 2:
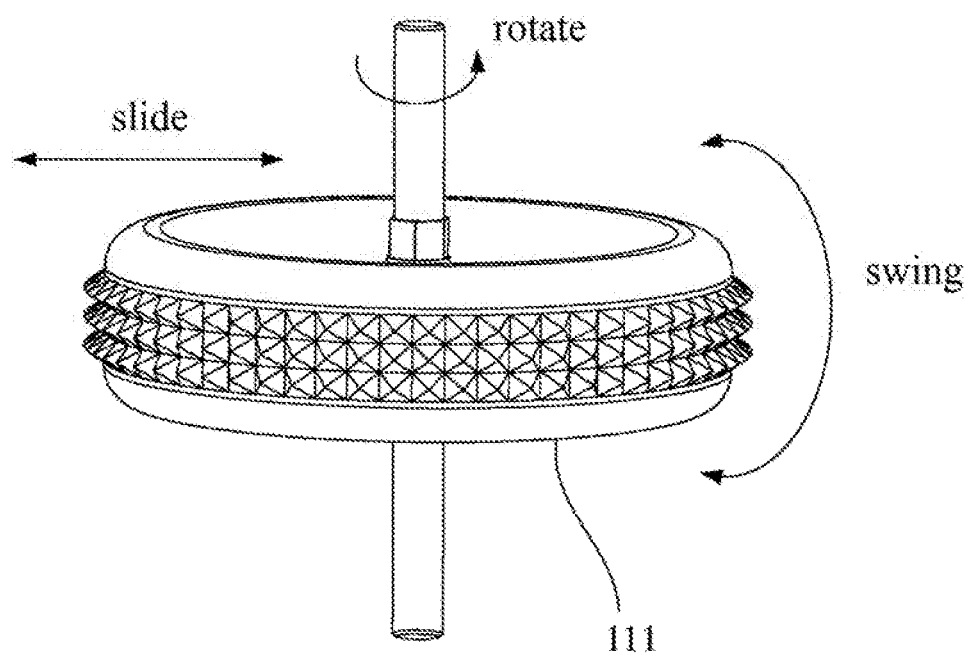
FIG. 2 is a schematic view of an activity mode of a dial of the remote controller as shown in FIG. 1.

Referring to FIG. 2, in the illustrated embodiment, the activity modes of the dial 111 may comprise three activity modes of rotating around the rotation shaft, sliding along the preset sliding direction, and swinging along the preset swing direction.

Correspondingly, in order to sense the above-described three activity modes of the dial 111, the sensor 113 may comprise a rotation sensor 113a configured to sense rotating state information of the dial 111, a sliding sensor 113b configured to sense sliding state information of the dial 111, a swing sensor 113c configured to sense swing state information of the dial 111.

In some embodiments, the rotating state information may be set according to different requirements. For example, the rotating state information may comprise at least one of an angle that the dial 111 rotates, a rotating angle of the dial 111 with respect to a zero point position, a rotating speed of the dial 111, an angular acceleration of the dial 111 when rotating, or a magnitude of a torque force endured by the dial 111 when rotating.

In order to sense the above-described various different rotating state information, the rotation sensor 113a may correspondingly comprise an angular sensor configured to sense the angle that the dial rotates, an angular displacement sensor configured to sense the rotating angle of the dial 111 with respect to the zero point position, an angular speed sensor configured to sense a rotating speed of the dial 111, an angular acceleration sensor configured to sense an angular acceleration when the dial 111 rotates, a torsion sensor configured to sense a magnitude of a torque force endured by the dial 111 when rotating, and so on.

For the activity mode of the dial 111 rotating around the rotation shaft, the dial 111 may be reset automatically. That is, after the dial 111 rotates and is released, the dial 111 may return to an original position automatically.

In some embodiments, the dial 111 may also stop at any position. For example, after the dial 111 rotates and is released, the dial 111 may stop at a current rotating position.

In some embodiments, the sliding state information may be set according to different requirements. For example, the sliding state information may comprise at least one of a distance that the dial 111 slides, a displacement that the dial 111 slides, a sliding speed of the dial 111, an acceleration when the dial 111 slides, or a magnitude of a pressure endured by the dial 111 when sliding.

In order to sense the above-described various different sliding state information, the sliding sensor 113 may correspondingly comprise at least one of a distance sensor configured to sense the distance that the dial 111 slides, a linear displacement sensor configured to sense the displacement that the dial 111 slides, a linear speed sensor configured to sense the sliding speed of the dial 111, a linear acceleration sensor configured to sense the acceleration when the dial 111 slides, or a pressure sensor configured to sense the magnitude of the pressure endured by the dial 111 when sliding.

For the activity mode of the dial 111 sliding along the preset sliding direction, the dial 111 may be rest automatically. That is, after the dial 111 slides and is released, the dial 111 may be reset to the original position automatically.

In some embodiments, the dial 111 may also stop at any position. For example, after the dial 111 slides and is released, the dial 111 may stop at a current sliding position.

In some embodiments, the swing state information may be set according to different requirements. For example, the swing state information may comprise at least one of an angle that the dial 111 swings, a swing angle of the dial 111 with respect to the zero point position, a swing speed of the dial 111, an angular acceleration when the dial 111 swings, or a magnitude of a torque force endured by the dial 111 when swinging.

In order to sense the above-described various different swing state information, the swing sensor 113c may correspondingly comprise at least one of an angular sensor configured to sense the angle that the dial 111 swings, an angular displacement sensor configured to sense the swing angle of the dial 111 with respect to the zero point position, an angular speed sensor configured to sense the swing speed of the dial 111, an angular acceleration sensor configured to sense the angular acceleration when the dial 111 swings, a torsion sensor configured to sense the magnitude of the torque force endured by the dial 111 when swinging.

For the activity mode of the dial 111 swinging along the preset swing direction, the dial 111 may be reset automatically. That is, after the dial 111 swings and is released, the dial 111 may be reset to the original position automatically.

In some embodiments, the dial 111 also may stop at any position. For example, after the dial 111 swings and is released, the dial 111 may stop at a current swing position.

The controller 120 may be electrically connected with the sensor 113. The specific structure of the controller 120 may be designed according to different requirements. For example, the controller 120 may be a circuit board provided with a controlling circuit, or a controlling chip, or the like.

The signal transmitting device 130 may be electrically connected with the controller 120. In some embodiments, the sensor 113 may transfer the activity state information to the controller 120, and the controller 120 may transmit a corresponding control signal via the signal transmitting device 130.

The specific structure of the signal transmitting device 130 may be designed according to different requirements. For example, the signal transmitting device 130 may be an antenna, a high definition image transmission device, or the like.

Based on the above-described remote controller 100, an embodiment of the present disclosure may further provide a controlling method for controlling a remotely controlled device. The controlling method may comprise controlling the remotely controlled device by operating the dial 111 of the dial structure 110 of the above-described remote controller 100. The controlling method according to an embodiment of the present disclosure will be described in detail below.

Figure 3:
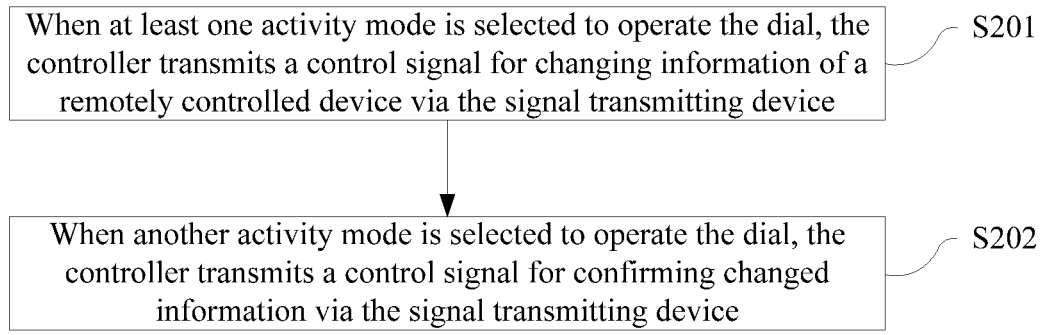
FIG. 3 is a flow chart of a controlling method employing the remote controller as shown in FIG. 1 according to an embodiment of the present disclosure.

Referring to FIG. 3, a controlling method according to an embodiment of the present disclosure may employ the above-described remote controller 100 for controlling a remotely controlled device. The controlling method may implement a single operating function using the plurality of activity modes of the dial 111, i.e., implementing one control by the plurality of activity modes of the dial 111. The controlling method will be described in detail below.

At S201, when at least one activity mode is selected to operate the dial 111, the controller 120 may transmit a control signal for changing information of the remotely controlled device via the signal transmitting device 130.

In some embodiments, when one or more activity modes are selected to operate the dial 111 in sequence or simultaneously, the sensor 113 may obtain activity state information of the one or more activity modes. The controller 120, according to the activity state information of the one or more activity modes, may transmit a corresponding control signal via the signal transmitting device 130.

The information of the remotely controlled device may be designed according to different circumstances. For example, in some embodiments, the information may comprise body information of a body of the remotely controlled device. For example, the body information may comprise at least one of an attitude of the body, a moving mode of the body, a moving speed of the body, an altitude of the body, a moving direction of the body, or an operating mode of the body.

The remotely controlled device may be a UAV, a remotely controlled chariot, a gimbal, an imaging device, or the like. In some embodiments, when the remotely controlled device is the UAV, the body information may comprise at least one of attitude information of the body of the UAV (such as an attitude angle or an angular speed), a flight mode of the UAV (such as a "Follow me" mode of the UAV, a constant altitude flight mode, or an automatic landing mode), a flight speed of the UAV, a flight altitude of the UAV, or a flight direction of the UAV.

In some embodiments, the remotely controlled device may comprise a functional load, and the information may comprise load information of the functional load. For example, the load information may comprise at least one of an attitude of the functional load, an operating parameter of the functional load, or a control mode of the functional load.

For example, when the remotely controlled device is a UAV, the functional load may be an imaging device, a pesticide spraying device, an external wall cleaning device, or the like. In some embodiments, when the functional load is the imaging device, the load information may comprise at least one of an attitude of the imaging device (such as a shooting angle of the imaging device or the like), an operating parameter of the imaging device (such as a shutter speed, an aperture size, a sensitivity, or the like), or a control mode of the imaging device (such as a continuous photographing mode, a delay photographing mode, or the like).

In some embodiments, the remote controller may comprise a carrier, and the information may comprise carrier information of the carrier. For example, the carrier information may comprise at least one of an attitude of the carrier or a control mode of the carrier.

For example, when the remotely controlled device is a UAV, the carrier may be a gimbal, a carrying support frame, or the like. In some embodiments, when the carrier is a gimbal, the carrier information may be the attitude of the gimbal (such as an attitude angle or the like) or a rotating shaft control mode of the gimbal (such as a single-axis control, a double-axis control, a three-axis control, or the like).

In some embodiments, specific manners for changing the information for the remotely controlled device may be designed according to different requirements. For example, changing the information for the remotely controlled device may be selecting one type of information from a plurality of types of information, or adjusting a numerical value of the information, or converting one type of information to another type of information. For example, when the rotating shaft control mode of the gimbal is changed, one of the control modes of 'one-axis control', 'double-axis control', and 'three-axis control' may be selected. When the shutter speed of the imaging device is changed, a numerical value of the shutter speed of the imaging device may be adjusted directly. When a parameter setup option of the imaging device is changed, an interface of operating parameters of the imaging device may be changed to an interface of a control mode of the imaging device.

At S202, when another activity mode is selected to operate the dial 111, the controller 120 may transmit a control signal for confirming changed information via the signal transmitting device 130.

In some embodiments, after the information of the remotely controlled device is changed, the activity mode may be selected to operate the dial 111, to confirm finally the changed information of the remotely controlled device.

For example, when the information is the attitude angle of the body of the UAV, an activity mode of 'dial rotating' may be employed first, to change the numerical value of the attitude angle of the body of the UAV. Then, an activity mode of 'dial sliding' may be employed to confirm the final numerical value of the attitude angle, i.e., the numerical value of the attitude angle may be further confirmed by pressing the dial 111.

In some embodiments, when the information is the shutter speed of the imaging device, the activity mode of 'dial rotating' may be employed first, to change the shutter speed of the imaging device. Then, the activity mode of 'dial sliding' may be employed to confirm the final shutter speed, i.e., the shutter speed may be confirmed by pressing the dial 111.

In some embodiments, when the information is the rotating shaft control mode of the gimbal, the activity mode of 'dial rotating' may be employed first, to change the rotating shaft control mode of the gimbal. Then, the activity mode of 'dial sliding' may be employed to confirm the final rotating shaft control mode, i.e., the rotating shaft control mode can be further confirmed by pressing the dial 111.

Figure 4:
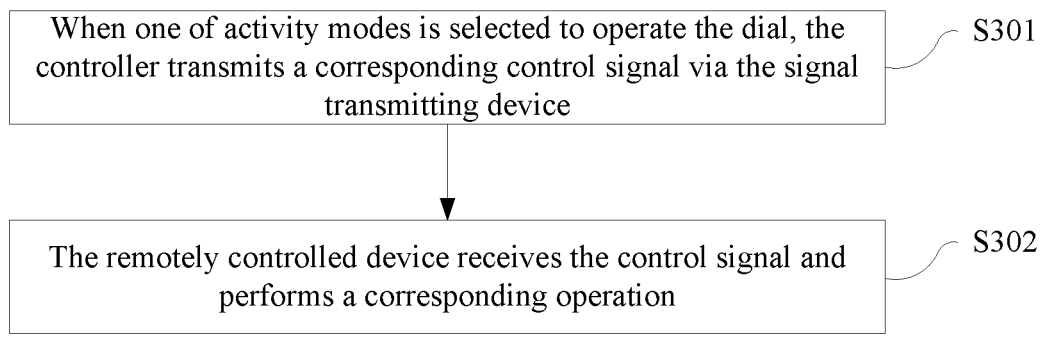
FIG. 4 is a flow chart of a controlling method employing the remote controller as shown in FIG. 1 according to another embodiment of the present disclosure.

Referring to FIG. 4, a controlling method according to another embodiment of the present disclosure may be similar to the controlling method described above with reference to FIG. 3. The controlling method shown in FIG. 4 differs from the controlling method shown in FIG. 3 in that the controlling method shown in FIG. 4 may employ a single activity mode of the dial 111 to control a single function of the remotely controlled device, i.e., completing one control by a single activity mode of the dial 111, which is similar to a 'one key control'.

At S301, when one of the activity modes is selected to operate the dial 111, the controller 120 may transmit a corresponding control signal via the signal transmitting device 130.

In some embodiments, one activity mode is selected to operate the dial 111. The sensor 113 may obtain the activity state information of the activity mode. The controller 120 may transmit the corresponding control signal via the signal transmitting device 130 according to the activity state information of the activity mode.

The control signal may be designed according to different circumstances. For example, in some embodiments, the control signal may comprise a signal for controlling the body information of the remotely controlled device. The body information may be the same as that in the controlling method described above with reference to FIG. 3, and detailed description thereof is omitted.

In some embodiments, the remotely controlled device may comprise a functional load, and the control signal may comprise a signal for controlling load information of the functional load. The load information may be the same as that in the controlling method described above with reference to FIG. 3, and detailed description thereof is omitted.

In some embodiments, the UAV may further comprise a carrier, and the control signal may comprise a signal for controlling carrier information of the carrier. The carrier information may be the same as that in the controlling method described above with reference to FIG. 3, and detailed description thereof is omitted.

At S302, the remotely controlled device may receive the control signal, and perform a corresponding operation.

In some embodiments, the remotely controlled device, when receiving the control signal, may control its own part or program to perform the operation corresponding to the control signal.

For example, when the control signal is a signal for controlling an attitude angle of a gimbal, the activity mode of 'dial rotating' may be employed to operate the dial 111. When the dial 111 rotates to a preset position, the attitude angle of the gimbal may be adjusted to a numerical value corresponding to the rotating angle of the dial 111.

In some embodiments, when the control signal is a signal for controlling a shutter speed of the imaging device, the activity mode of 'dial sliding' may be employed to adjust the shutter speed. When the dial 111 slides to a sliding position and stops for a preset time, the shutter speed of the imaging device may be adjusted to a numerical value corresponding to the sliding position.

In some embodiments, when the control signal is a signal for controlling a flight direction of the UAV, the activity mode of 'dial swinging' may be employed to select the flight direction of the UAV. For example, the UAV may be controlled to perform an emergency ascending to avoid obstacles by swinging the dial 111 upwards, or be controlled to perform an emergency descending to avoid obstacles by swing the dial 111 downwards.

Figure 5:
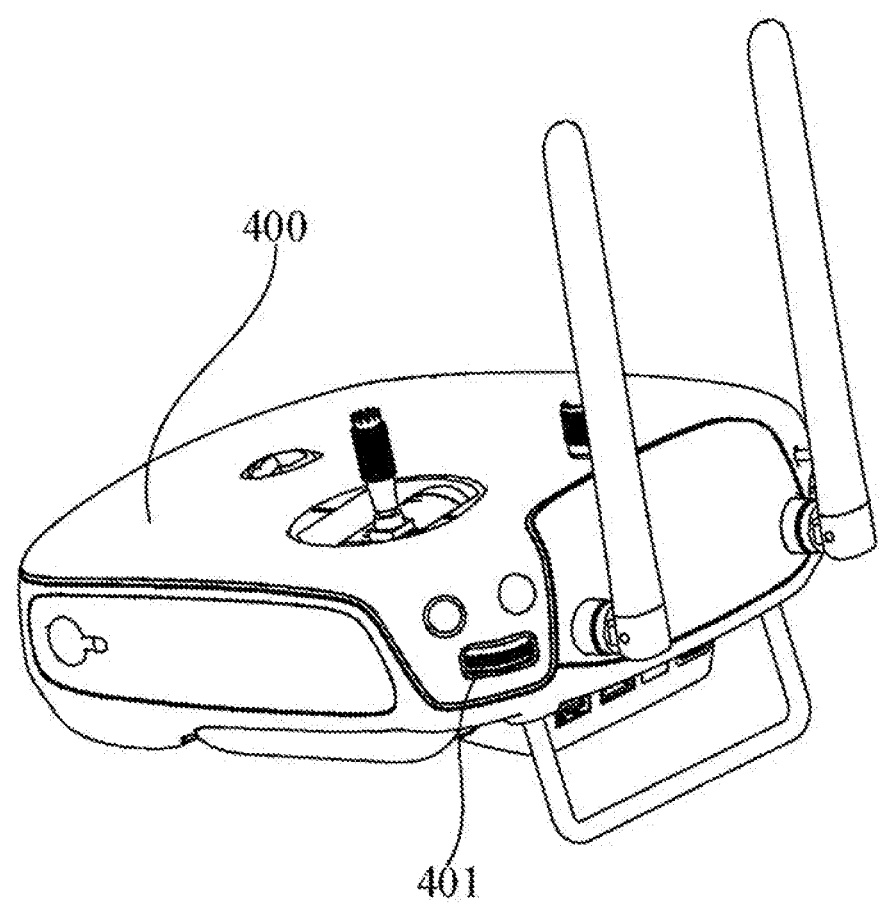
FIG. 5 is a schematic view of a remote controller according to another embodiment of the present disclosure.
Figure 6:
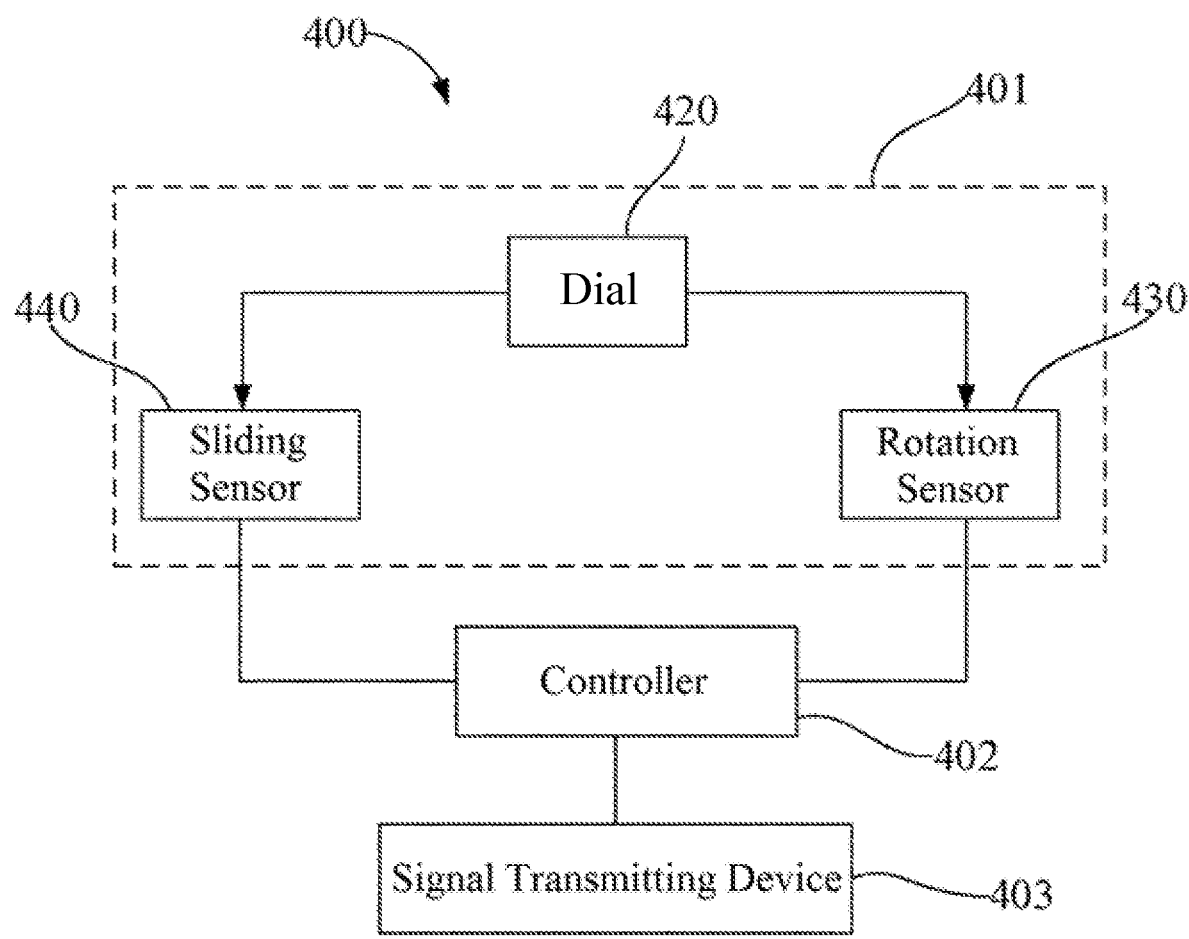
FIG. 6 is a schematic diagram of the remote controller as shown in FIG. 5.

Referring to FIG. 5 and FIG. 6, a remote controller 400 according to another embodiment of the present disclosure may comprise a dial structure 401, a controller 402, and a signal transmitting device 403.

Figure 7:
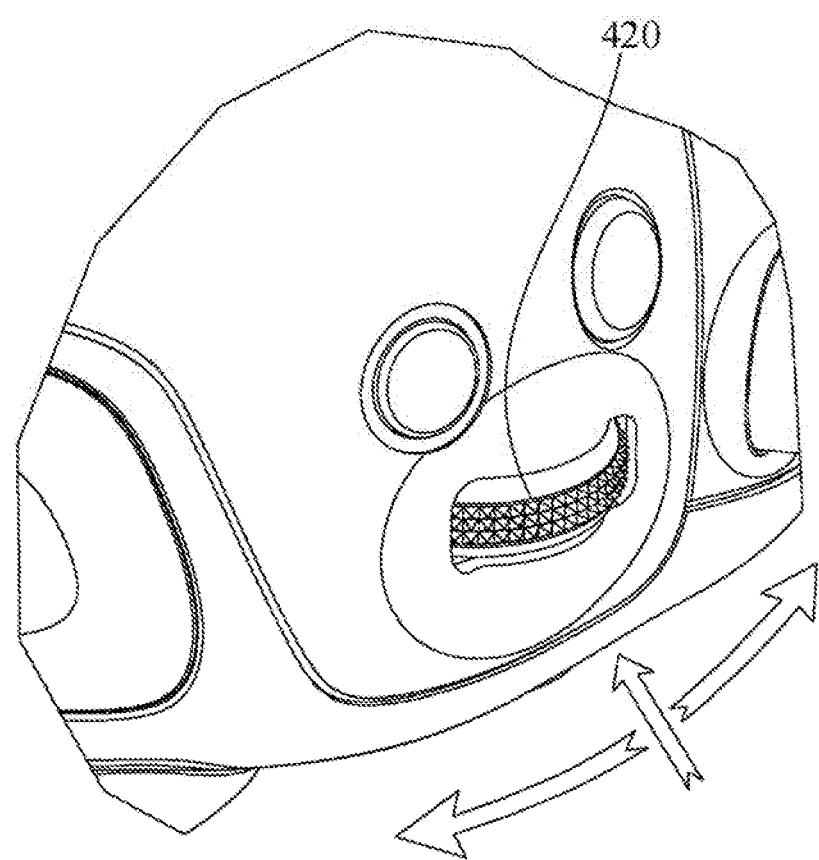
FIG. 7 is a schematic view of an activity mode of a dial of the remote controller as shown in FIG. 5.
Figure 8:
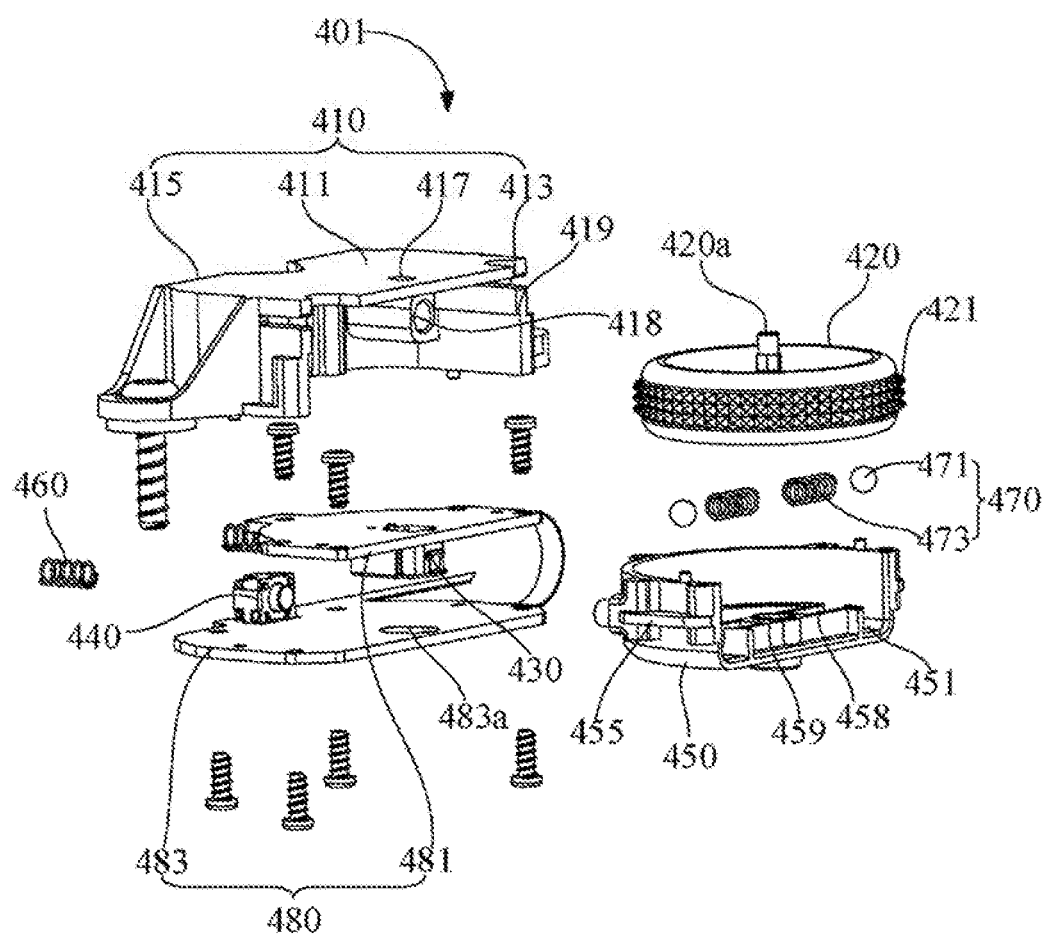
FIG. 8 is an exploded view of a dial structure of the remote controller as shown in FIG. 5.

Referring to FIG. 7 and FIG. 8, the dial structure 401 may comprise a dial base 410, a dial 420, a rotation sensor 430, and a sliding sensor 440.

The specific structure of the dial base 410 may be designed according to different requirements. For example, in the illustrated embodiment, the dial base 410 may comprise a bottom plate 411, two first side plates 413, and one second side plate 415. One side edge of each of the two first side plates 413 may be fixedly connected with one of two opposite sides of the bottom plate 411. Another side edge adjacent to the one side edge of each of the two first side plates 413 may be connected with one of two opposite sides of the second side plate 415 such that the two first side plates 413 and the second side plate 415 may jointly form a concave portion.

The dial 420 may be movably connected with the dial base 410. The dial 420 may slide with respect to the dial base 410, and rotate around a rotation shaft 420a. An axial direction of the rotation shaft 420a may intersect a sliding direction of the dial 420. In some embodiments, the axial direction of the rotation shaft 420a may be perpendicular to the sliding direction of the dial 420.

A connecting manner of the dial 420 and the dial base 410 may be designed according to different requirements. For example, in the illustrated embodiment, the dial base 410 may serve as a carrying member for the dial 420, and the dial 420 may be movably connected with the dial base 410 through the rotation shaft 420a.

In some embodiments, the rotation shaft 420a may be fixedly connected with the dial 420. A sliding portion 417 that matches the rotation shaft 420a may be provided on the dial base 410. The rotation shaft 420a may rotate within the sliding portion 417, and slide along an extending direction of the sliding portion 417. The sliding portion 417 may be a sliding hole, a sliding groove, a sliding guiding rib, or the like that is provided on the dial base 410.

Further, in order to facilitate the operating of the dial 420, a friction portion 421 may be provided on an outer periphery of the dial 420. The friction portion 421 may be implemented in different ways. For example, the friction portion 421 may be a pattern formed at the outer periphery of the dial 420, an elastic layer covering the outer periphery of the dial 420, an array of convex teeth formed at the outer periphery of the dial 420, or the like.

Further, in order to limit the position of the dial 420, the dial structure 401 may also comprise a dial cover 450 disposed opposite to the dial base 410. The dial 420 may be located between the dial cover 450 and the dial base 410.

The dial 420 may be rotatably connected with the dial cover 450 through the rotation shaft 420a. Specific connecting manners between the dial 420 and the dial cover 450 may be designed according to different requirements. In the illustrated embodiment, the rotation shaft 420a may be fixedly connected with the dial 420 and an axle hole may be provided on the dial cover 450 for the rotation shaft 420a to be inserted in, such that the dial 420 can rotate with respect to the dial cover 450.

In some other embodiments, the rotation shaft 420a may be fixedly connected with the dial cover 450 and an axle hole may be provided on the dial 420 for the rotation shaft 420a to be inserted in, such that the dial 420 can rotate with respect to the dial cover 420.

Further, in order to make the rotation of the dial 420 more stable, the dial 420 may be a rolling wheel with a concave middle portion. An annular sliding groove 451 may be provided on the dial cover 450. The periphery of the dial 420 may be at least partially accommodated within the sliding groove 451 and rotatable along the sliding groove 451.

Figure 9:
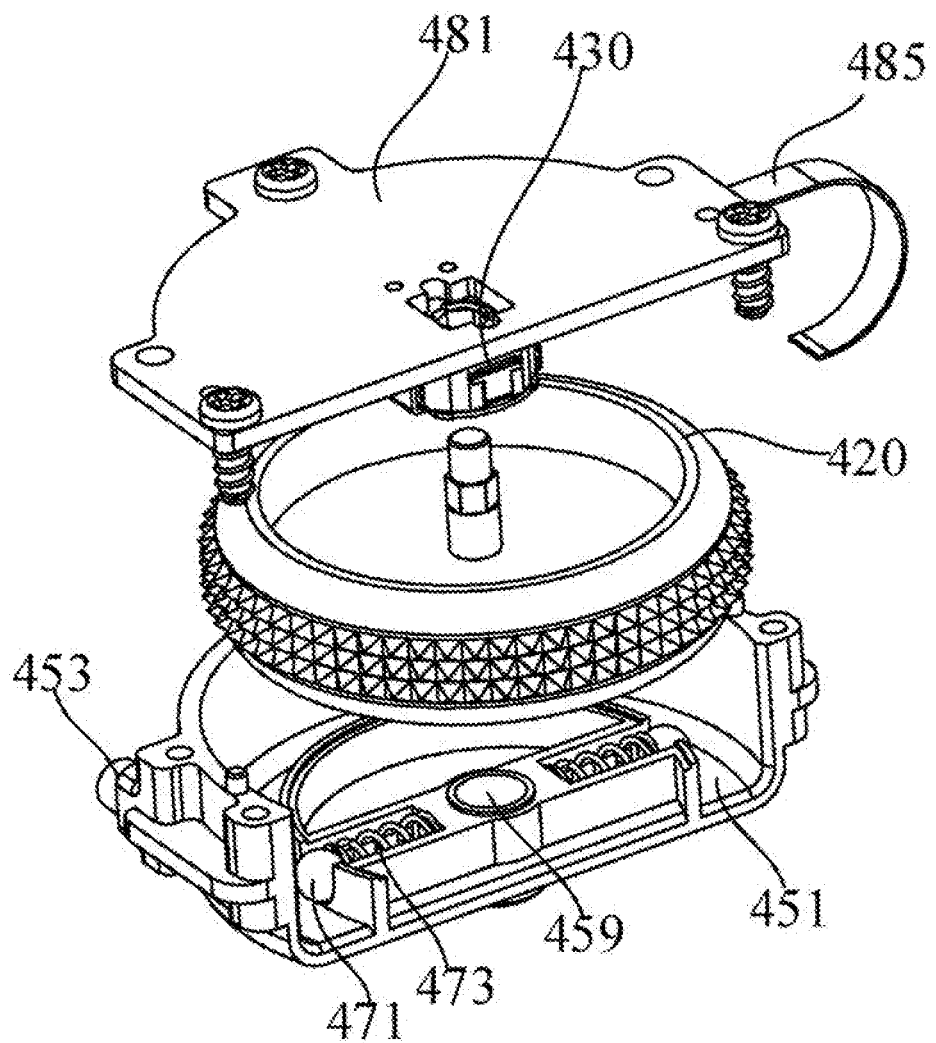
FIG. 9 is a partial exploded view of a dial structure of the remote controller as shown in FIG. 5.
Figure 12:
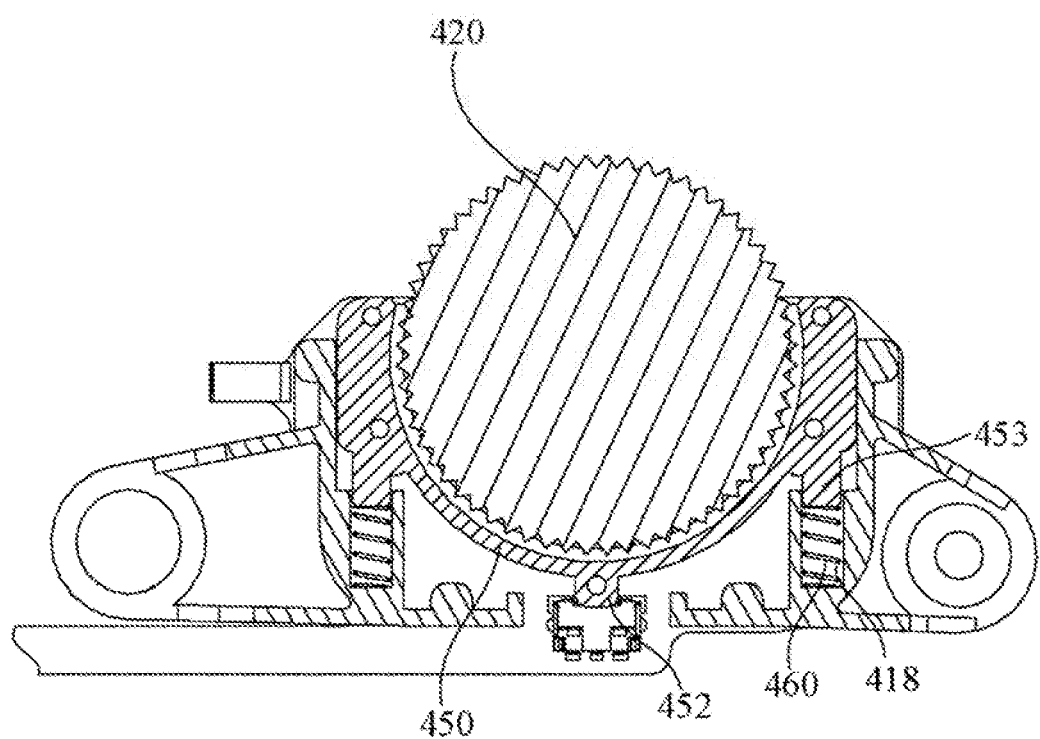
FIG. 12 is an axial sectional view of the dial structure of the remote controller as shown in FIG. 8.

Further, in order to enable the dial 420 to be slidable with respect to the dial base 410, the dial cover 450 may be slidably connected with the dial base 410, and the dial cover 450 may slide along with the dial 420. As shown in FIG. 9 and FIG. 12, in the illustrated embodiment, a guiding post 453 may be provided on the dial cover 450, and a guiding hole 418 may be provided on the dial base 410. The guiding post 453 may be inserted into the guiding hole 418, to allow the dial cover 450 to slide along an extending direction of the guiding hole 418.

In some other embodiments, the guiding post 453 may be provided on the dial base 410, and the guiding hole 418 may be provided on the dial cover 450. The guiding post 453 may be inserted into the guiding hole 418, to allow the dial cover 450 to slide along the extending direction of the guiding post 453.

It should be noted that, the dial cover 450 and the dial base 410 may not necessarily be slidably connected. In some embodiments, the dial cover 450 and the dial base 410 may also be fixedly connected, and the dial 420 may be slidable with respect to the dial cover 450.

Further, in order to allow the dial cover 450 to restore automatically after sliding with respect to the dial base 410, the dial structure 401 may also comprise a sliding reset member 460 configured to provide an elastic restoring force to the dial cover 450. In some embodiments, the sliding reset member 460 may be received within the guiding hole 418 and abut against the guiding post 453. The sliding reset member 460 may be a compression spring, an elastic rubber barrel, an elastic rubber post, or the like.

Further, in order that the dial cover 450 may slide steadily with respect to the dial base 410, a limit portion 455 may be provided on the dial cover 450, and a fitting portion 419 may be provided on the dial base 410. The limit portion 455 and the fitting portion 419 may fit with each other to allow the dial cover 450 to slide with respect to the dial base 410 along a sliding direction of the dial 420.

The specific structures of the limit portion 455 and the fitting portion 419 may be designed according to different requirements. For example, in the illustrated embodiment, the limit portion 455 may be a limit rib provided on an outer wall of the dial cover 450, and the fitting portion 419 may be a fitting groove provided on an inner wall of the dial base 410. The limit rib may slide along the fitting groove.

In some other embodiments, the limit portion 455 may be a long-narrow limit groove provided on the outer wall of the dial cover 450, and the fitting portion 419 may be a fitting post provided on the inner wall of the dial base 410. The fitting post may slide within the fitting groove along an extending direction of the fitting groove.

Further, in order to facilitate an operator to perceive the rotating state of the dial 420, a hand feel mechanism 470 may be included for providing a sense of damping when the dial 420 rotates.

Figure 10:
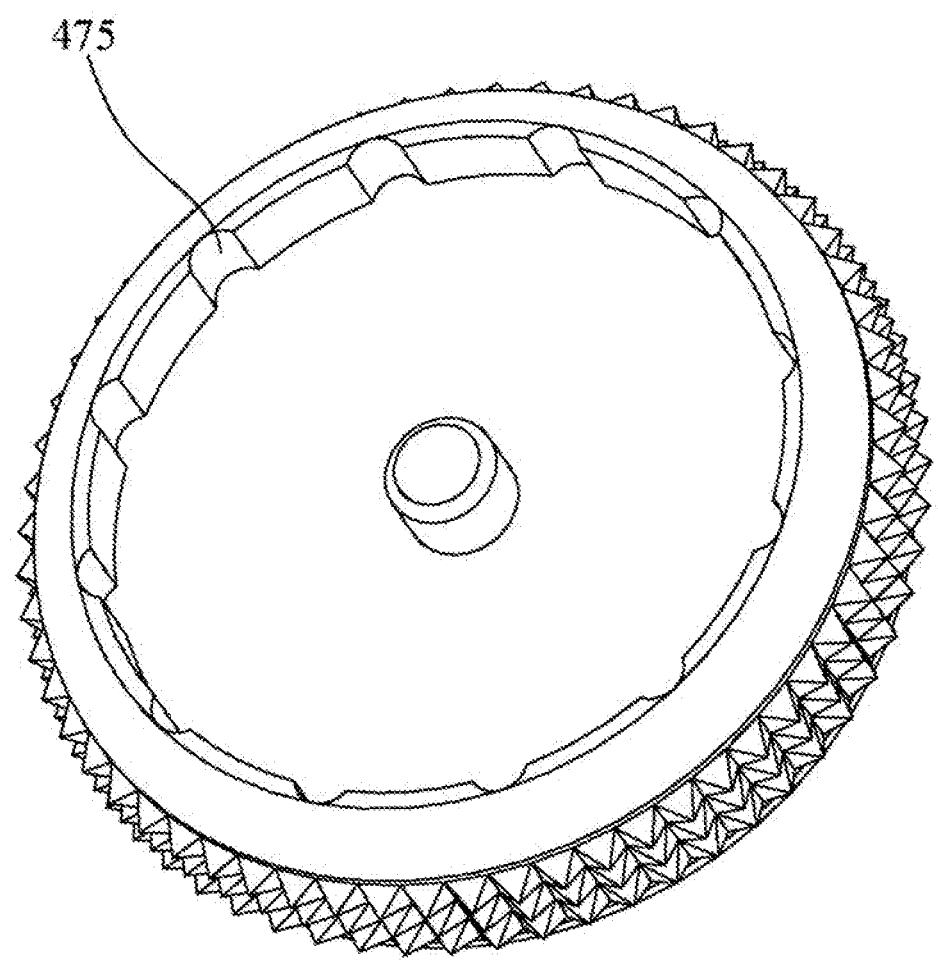
FIG. 10 is a perspective view of a dial of the dial structure of the remote controller as shown in FIG. 9.
Figure 11:
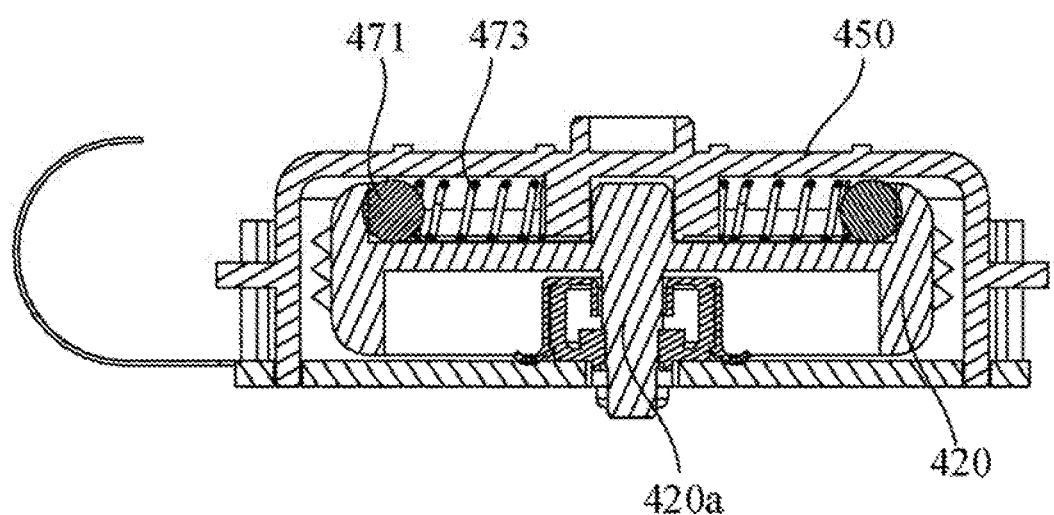
FIG. 11 is a radial sectional view of the dial structure of the remote controller as shown in FIG. 9.

The specific structure of the hand feel mechanism 470 may be designed according to different requirements. For example, as shown in FIG. 10 and FIG. 11, in the illustrated embodiment, the hand feel mechanism 470 may comprise a roll ball 471, an elastic reset member 473, and a plurality of locating portions 475. A receiving groove 458 may be provided on the dial cover 450 for accommodating the roll ball 471 and the elastic reset member 473. The elastic reset member 473 may abut against the roll ball 471 for providing an elastic restoring force to the roll ball 471. The plurality of locating portions 475 may be provided on the dial 420 and disposed spaced apart from each other. In some embodiments, the locating portions 475 may be provided on a sidewall of the concave groove formed by concaving the middle portion of the dial 420. The roll ball 471 may be selectively fitted with one of the plurality of locating portion 475, to provide a resistance force to the dial 420.

The locating portions 475 may be locating grooves, locating bosses, or the like. In the illustrated embodiment, the locating portions 475 may be locating grooves that are adapted to the roll ball 471 in shape. When the roll ball 471 rolls into the locating grooves, the dial 420 may stop at the current position even if the dial 420 is released.

Further, two sets of the above-described roll ball 471 and elastic reset member 473 may be provided and disposed symmetrically with respect to a straight line.

Further, in some embodiments, a torsion spring may be fixedly sleeved on the rotation shaft 420a of the dial 420, and a stop portion configured to abut against one end of the torsion spring may be provided on the dial cover 450. After the dial 420 rotates, the dial 420 may restore automatically under the effect of a torque force of the torsion spring.

In some other embodiments, the hand feel mechanism 470 may comprise an elastic post and a plurality of blocking portions disposed spaced apart from each other. The elastic post may be provided on one of the dial 420 and the dial cover 450, and the plurality of blocking portions may be provided on the other one of the dial 420 and the dial cover 450. The elastic post may be selectively clamped with one of the plurality of blocking portions, to provide a resistance force to the dial 420.

The rotation sensor 430 may be configured to obtain rotating state information of the dial 420. In some embodiments, the rotating state information may be set according to different requirements. For example, the rotating state information may comprise at least one of an angle that the dial 420 rotates, a rotating angle of the dial 420 with respect to a zero point position, a rotating speed of the dial 420, an angular acceleration when the dial 420 rotates, or a magnitude of a torque force endured by the dial 420 when rotating.

In order to sense the above-described various different rotating state information, the rotation sensor 430 may correspondingly comprise an angular sensor configured to sense the angle that the dial 420 rotates, an angular displacement sensor configured to sense the rotating angle of the dial 420 with respect to the zero point position, an angular speed sensor configured to sense the rotating speed of the dial 420, an angular acceleration sensor configured to sense the angular acceleration when the dial 420 rotates, a torsion sensor configured to sense the magnitude of the torque force endured by the dial 420 when rotating, and so on.

In the illustrated embodiment, the rotation sensor 430 may be a potentiometric angular displacement sensor, i.e., a potentiometer. One end of the rotation shaft 420*a* of the dial 420 may be inserted in the potentiometer for sensing the rotating angle of the dial 420 with respect to the zero point position.

For an activity mode of the dial 420 rotating around the rotation shaft 420*a*, the dial 420 may restore automatically. That is, after the dial 420 rotates and is released, the dial 420 may return to an original position automatically.

In some other embodiments, the dial 420 also may stop at any position. That is, after the dial 420 rotates and is released, the dial 420 may stop at a current rotating position.

The sliding sensor 440 may be configured to obtain sliding state information of the dial 420. In some embodiments, the sliding state information may be set according to different requirements. For example, the sliding state information may comprise at least one of a distance that the dial 420 slides, a displacement that the dial 420 slides, a sliding speed of the dial 420, an acceleration when the dial 420 slides, or a magnitude of a pressure endured by the dial 420 when sliding.

In order to sense the above-described various different sliding state information, the sliding sensor 440 may correspondingly comprise at least one of a distance sensor configured to sense the distance that the dial 420 slides, a linear displacement sensor configured to sense the displacement that the dial 420 slides, a linear speed sensor configured to sense the sliding speed of the dial 420, a linear acceleration sensor configured to sense the acceleration when the dial 420 slides, or a pressure sensor configured to sense the magnitude of the pressure endured by the dial 420 when sliding.

In the illustrated embodiment, the sliding sensor 440 may be a trigger-type pressure sensor, such as a press switch. A trigger boss 452 (as shown in FIG. 12) corresponding to the sliding sensor 440 may be provided on an outer side on the dial cover 450. When the trigger boss 452 abuts against the press switch with a pressure exceeding a preset pressure, the press switch may be triggered to generate a trigger signal, which may represent the sliding state information of the dial 420.

For an activity mode of the dial 420 sliding along a preset direction, the dial 420 may restore automatically. That is, after the dial 420 slides and is released, the dial 420 may restore to the original position automatically.

In some other embodiments, the dial 420 may stop at any position. That is, after the dial 420 slides and is released, the dial 420 may stop at a current sliding position.

Further, as shown in FIG. 8 and FIG. 9, the dial structure 401 may further comprise a circuit board 480 electrically connected with the rotation sensor 430 and the sliding sensor 440.

In the illustrated embodiment, the circuit board 480 may comprise an upper circuit board 481 fixedly connected with the dial cover 450. The upper circuit board 481 and the dial cover 450 collectively form an accommodating chamber for accommodating the dial 420. The rotation sensor 430 may be disposed at the upper circuit board 481 and electrically connected with the upper circuit board 481.

The circuit board 480 may further comprise a lower circuit board 483 fixedly connected with the dial base 410. The lower circuit board 483 and the dial cover 450 collectively form an accommodating groove for accommodating the dial cover 450 and the upper circuit board 481. The sliding sensor 440 may be disposed at the lower circuit board 483 and electrically connected with the lower circuit board 483.

Further, the upper circuit board 481 may be electrically connected with the lower circuit board 483 through a flexible circuit board 485.

The lower circuit board 483 and the dial 420 may be slidably and rotatably connected. In the illustrated embodiment, the lower circuit board 483 may be provided with a lower sliding hole 483*a* for the rotation shaft 420*a* to be inserted in. The dial cover 450 may be provided with a pivot 459 disposed coaxially with the rotation shaft 420*a*. The pivot 459 may be inserted in the lower sliding hole 483*a*, and may rotate within the lower sliding hole 483*a* and slide along an extending direction of the lower sliding hole 483*a*.

Correspondingly, a sliding portion 417 for the rotation shaft 420*a* to be inserted in may be provided on the dial base 410. In some embodiments, the sliding portion 417 may be an upper sliding hole. The rotation shaft 420*a* may be inserted in the sliding portion 417, and may rotate within the sliding portion 417 and slide along an extending direction of the sliding portion 417.

It should be noted that, a carrying member for the dial 420 may be the dial base 410 alone, or may be another structure, as described below.

For example, in some embodiments, the carrying member may comprise the circuit board 481 and the dial cover 450 that collectively form an accommodating chamber for the dial 420. The rotation sensor 430 and the sliding sensor 440 may both be arranged on the circuit board.

Further, in order that the dial 420 be slidable and rotatable with respect to the carrying member, the circuit board 481 and the dial cover 450 may each be provided with a sliding hole. Two ends of the rotation shaft 420*a* may be inserted in the sliding holes of the circuit board 481 and the dial cover 450, respectively, and be rotatable within the sliding holes and slidable along the extending directions of the sliding holes.

In some other embodiments, the carrying member may comprise the upper circuit board 481 and the lower circuit board 483 that are disposed opposite to and spaced apart from each other. The dial 420 may be disposed between the upper circuit board 481 and the lower circuit board 483. The upper circuit board 481 and the lower circuit board 483 may each be provided with a sliding hole for the rotation shaft 420*a* to be inserted in. The rotation shaft 420*a* may be rotatable in the sliding holes and slidable along the extending directions of the sliding holes.

Further, one side of the upper circuit board 481 may be fixedly connected with one side of the lower circuit board 483 through a support portion. The support portion is configured to maintain a preset spacing between the upper circuit board 481 and the lower circuit board 483.

The controller 402 may be electrically connected with the rotation sensor 430 and the sliding sensor 440. The specific structure of the controller 402 may be designed according to different requirements. For example, the controller 402 may be a circuit board provided with a controlling circuit, a controlling chip, or the like.

The signal transmitting device 403 and the controller 402 may be electrically connected. In some embodiments, the rotation sensor 430 and the sliding sensor 440 may transfer respectively the sliding state information and the rotating state information to the controller 402, which may transmit a corresponding control signal via the signal transmitting device 403.

The specific structure of the signal transmitting device 403 may be designed according to different requirements. For example, the signal transmitting device 403 may be an antenna, a high definition image transmission device, or the like.

Based on the above-described remote controller, the present disclosure also provides a controlling method for a UAV. The controlling method may include controlling the UAV by operating the dial 420 of the dial structure 401 of the above-described remote controller.

Figure 13:
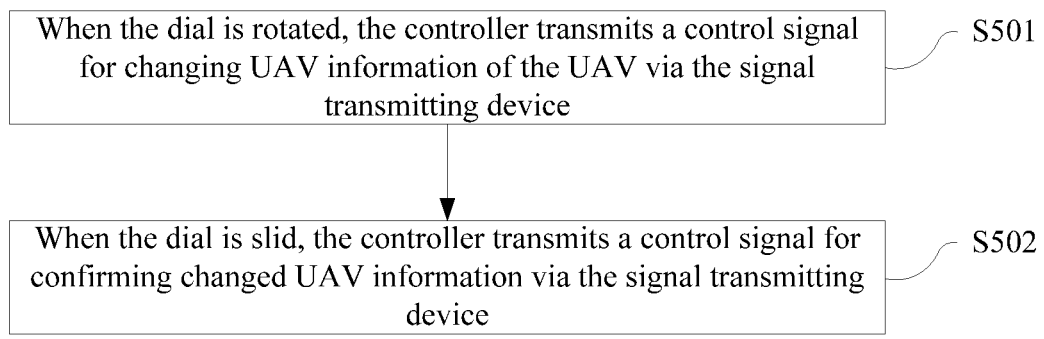
FIG. 13 is a flow chart of a controlling method employing the remote controller as shown in FIG. 8 according to an embodiment of the present disclosure.

Referring to FIG. 13, a controlling method for a UAV according to an embodiment of the present disclosure, which may employ the dial structure 401 of the above-described embodiments, is described below.

At S501, when the dial 420 is rotated, the controller 402 may transmit a control signal for changing UAV information of the UAV via the signal transmitting device 403.

In some embodiments, when the dial 420 rotates, the rotation sensor 430 may obtain rotating state information of the dial 420, and transfer the rotating state information to the controller 402, which may transmit the control signal corresponding to the rotating state information via the signal transmitting device 403. The control signal may be used for changing the UAV information.

The UAV information may be designed according to different circumstances. For example, in some embodiments, the UAV information may comprise body information of the body of the UAV. For example, the body information may comprise at least one of an attitude of the body, a flight mode of the body, a flight speed of the body, a flight altitude of the body, or a flight direction of the body.

In some embodiments, the UAV may further comprise an imaging device, and the UAV information may comprise imaging device information of the imaging device. The imaging device may be disposed within the body of the UAV, or hanged under the body of the UAV. The imaging device information may comprise at least one of an operating mode of the imaging device, a shutter speed of the imaging device, an aperture size of the imaging device, or a preview image of the imaging device.

In some embodiments, the UAV may comprise a gimbal, and the UAV information may comprise gimbal information of the gimbal. The imaging device may be hanged under the body of the UAV through the gimbal. The gimbal information may comprise at least one of an attitude of the gimbal or a control mode of the gimbal.

In some embodiments, changing the UAV information may comprise at least one of selecting one type of UAV information from a plurality of types of UAV information, adjusting a numerical value of the UAV information, converting one of the plurality of types of UAV information to another type of UAV information. For example, when a control mode for the rotating shaft 420*a* of the gimbal is changed, one mode may be selected from the modes of 'single-axis control', 'double-axis control', and 'three-axis control'. When the shutter speed of the imaging device is changed, the numerical value of the shutter speed of the imaging device may be adjusted directly. When a setup parameter option of the imaging device is changed, an interface of an operating parameter of the imaging device may be changed to an interface of a control mode of the imaging device.

At S502, when the dial 420 is slid, the controller 402 may transmit a control signal for confirming the changed UAV information via the signal transmitting device 403.

In some embodiments, after the UAV information is changed, the dial 420 is slid, i.e., the dial 420 is pressed, the sliding sensor 440 may obtain sliding state information of the dial 420 and transfer the sliding state information to the controller 402, which may confirm finally the changed information of the UAV according to the sliding state information.

For example, when the UAV information is an attitude angle of the body of the UAV, the activity mode of 'dial rotating' may be employed first to change a numerical value of the attitude angle of the body of the UAV, then the actively mode of 'dial sliding' may be employed to confirm the final numerical value of the attitude angle. That is, the numerical value of the attitude angle may be further confirmed by pressing the dial 420.

In some embodiments, when the UAV information is a shutter speed of the imaging device, the activity mode of 'dial rotating' may be employed first to change the shutter speed of the imaging device, then the activity mode of 'dial sliding' may be employed to confirm the final shutter speed. That is, the shutter speed may be further confirmed by pressing the dial 420.

In some embodiments, when the UAV information is a control mode of the rotating shaft of the gimbal, the activity mode of 'dial rotating' may be employed first to change the control mode of the rotating shaft of the gimbal, then the activity mode of 'dial sliding' may be employed to confirm the final control mode of the rotating shaft. That is, the control mode of the rotating shaft may be further confirmed by pressing the dial 420.

The dial of the above-described dial structure may have a plurality of activity modes, such as dial rotating around a rotation shaft, dial sliding along a preset direction, and the like. Activity state information of the dial may be obtained by a sensor, to facilitate operating the dial by one operating mode or a combination of multiple operating modes. The purpose of implementing a plurality of operating functions may be achieved without the need for a plurality of dial structures or other controlling structures. Therefore, it is more convenient to use the above-described dial structure to realize a plurality of functions.

The foregoing description is merely illustrative of the embodiments of the disclosure, and is not intended to limit the scope of the disclosure. Any equivalent structural or flow variations made on the basis of the description and the drawings of the disclosure, and their direct or indirect application in other relevant technical fields, shall all fall into the scope of the disclosure.

What is claimed is:

1. A controlling method for controlling a remotely controlled device comprising:
   in response to a dial of a dial structure of a remote controller being rotated around a rotation axis of the dial, transmitting, by the remote controller, a first control signal initiating a changing process to change controlled device information of the remotely controlled device to updated controlled device information via a signal transmitting device of the remote controller; and
   after the dial is rotated around the rotation axis, in response to the dial being pressed along a direction perpendicular to the rotation axis of the dial, transmitting, by the remote controller, a second control signal confirming the updated controlled device information via the signal transmitting device.

2. The controlling method according to claim 1, wherein the controlled device information comprises body information of a body of the remotely controlled device.

3. The controlling method according to claim 2, wherein the body information comprises at least one of an attitude of the body, an operating mode of the body, a moving mode of the body, a moving speed of the body, a moving altitude of the body, or a moving direction of the body.

4. The controlling method according to claim 1, wherein:
the remotely controlled device comprises a functional load, and
the controlled device information comprises load information of the functional load.

5. The controlling method according to claim 4, wherein the load information comprises at least one of an attitude of the functional load, an operating parameter of the functional load, or a control mode of the functional load.

6. The controlling method according to claim 1, wherein:
the remotely controlled device further comprises a carrier, and
the controlled device information comprises carrier information of the carrier.

7. The controlling method according to claim 6, wherein the carrier information comprises at least one of an attitude of the carrier or a control mode of the carrier.

8. The controlling method according to claim 1, wherein initiating the changing process to change the controlled device information comprises at least one of selecting one type of controlled device information from a plurality of types of controlled device information, adjusting a numerical value of the controlled device information, or converting one of the plurality of types of controlled device information into other type of controlled device information.

9. A controlling method for an unmanned aerial vehicle (UAV) comprising:
in response to a dial of a dial structure of a remote controller being rotated around a rotation axis of the dial, transmitting, by the remote controller, a first control signal initiating a changing process to change UAV information or imaging device information of an imaging device of the UAV to updated UAV information or updated imaging device information via a signal transmitting device of the remote controller, wherein the imaging device information comprises at least one of an operating mode of the imaging device, a shutter speed of the imaging device, an aperture size of the imaging device, a light sensitivity of the imaging device, or a preview image of the imaging device; and
after the dial is rotated around the rotation axis, in response to the dial being pressed along a direction perpendicular to the rotation axis of the dial, transmitting, by the remote controller, a second control signal confirming the updated UAV information or the updated imaging device information via the signal transmitting device.

10. The controlling method according to claim 9 further comprising controlling a body of the UAV which pertains body information of a body of the UAV.

11. The controlling method according to claim 10, wherein the body information comprises at least one of an attitude of the body, a flight mode of the body, a flight speed of the body, a flight altitude of the body, or a flight direction of the body.

12. The controlling method according to claim 9, wherein the UAV further comprises a gimbal, and the UAV information comprises gimbal information of the gimbal.

13. The controlling method according to claim 12, wherein the gimbal information comprises at least one of an attitude of the gimbal or a control mode of the gimbal.

14. The controlling method according to claim 9, wherein initiating the changing process to change the UAV information comprises at least one of selecting one type of UAV information from a plurality of types of UAV information, adjusting a numerical value of the UAV information, or converting one of the plurality of types of UAV information into other UAV information.

15. An unmanned aerial vehicle (UAV) controlling method using a remote controller, the method comprising:
in response to a dial of the remote controller being rotated around a rotation axis of the dial, transmitting, by the remote controller, a first control signal initiating a changing process to change UAV information of the UAV to updated UAV information via a signal transmitting device of the remote controller; and
after the dial is rotated around the rotation axis, in response to the dial being pressed along a direction perpendicular to the rotation axis of the dial, transmitting, by the remote controller, a second control signal confirming the updated UAV information via the signal transmitting device.

16. The controlling method according to claim 15, wherein the UAV information comprises body information of a body of the UAV.

17. The controlling method according to claim 16, wherein the body information comprises at least one of an attitude of the body, a flight mode of the body, a flight speed of the body, a flight altitude of the body, or a flight direction of the body.

18. The controlling method according to claim 15, wherein the UAV further comprises an imaging device, and the UAV information comprises imaging device information of the imaging device.

19. The controlling method according to claim 1, wherein in response to the dial of the dial structure of the remote controller being rotated around the rotation axis of the dial, transmitting the first control signal by the remote controller includes:
obtaining rotating state information of the dial by a rotation sensor in response to the dial being rotated, the rotating state information including at least one of a rotating speed of the dial, an angular acceleration when the dial rotates, or a magnitude of a torque force endured by the dial when rotating; and
transmitting the first control signal corresponding to the rotating state information of the dial via the signal transmitting device.

20. The controlling method according to claim 1, wherein:
in response to the dial of the dial structure of the remote controller being rotated around the rotation axis of the dial, transmitting the first control signal by the remote controller includes:
in response to the dial of the dial structure of the remote controller is rotated around the rotation axis of the dial with respect to a dial cover of the dial structure, transmitting the first control signal by the remote controller; and
after the dial is rotated around the rotation axis, in response to the dial being pressed along the direction perpendicular to the rotation axis of the dial, transmitting the second control signal by the remote controller includes:
after the dial is rotated around the rotation axis, in response to the dial being pressed along the direction perpendicular to the rotation axis of the dial to cause both the dial and the dial cover to move along the direction, transmitting the second control signal by the remote controller.

\* \* \* \* \*